Oct. 31, 1933.   W. H. PRATT   1,933,339
DEMAND METER
Filed Nov. 2, 1931

Inventor:
William H. Pratt,
by Charles N. Tullar
His Attorney.

Patented Oct. 31, 1933

1,933,339

UNITED STATES PATENT OFFICE 1,933,339

DEMAND METER

William H. Pratt, Lynn, Mass., assignor to General Electric Company, a corporaton of New York Application November 2, 1931. Serial No. 572,632

6 Claims. (Cl. 171—34)

My invention relates to demand meters, and its object is to provide a simple, inexpensive meter of this type having a minimum of operating parts.

In carrying my invention into effect, I employ a demand meter dial scale which rotates in accordance with the quantity being integrated. This dial is provided with a friction pointer which is allowed to rotate with the dial except when held stationary by a dog. The dog is held stationary over the selected demand interval and released at the end thereof. When released it advances to a point opposite the zero indication on the dial, when it is again stopped and held stationary over the next demand interval. This arrangement simplifies the operating mechanism and eliminates the necessity of any setting back operation at the end of a demand interval.

Figure 1:
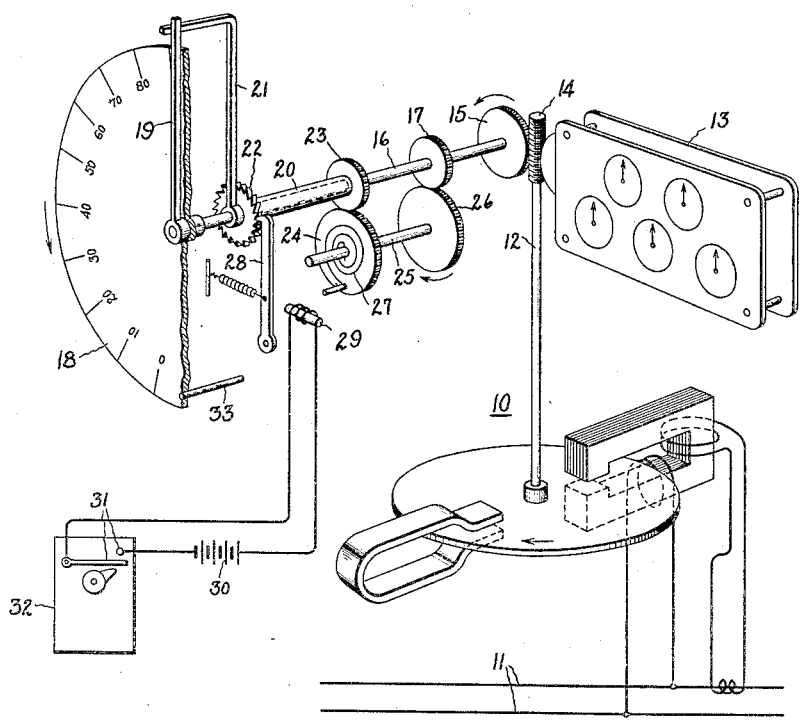
Figure 2:
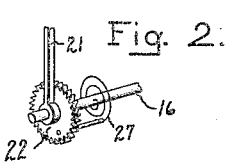

The features of the invention which are believed to be novel and patentable will be pointed out in the claims appended hereto. For a better understanding of my invention reference is made in the following description to the accompanying drawing showing in Fig. 1 one modification of the invention as applied for measuring and indicating the maximum demand of electric energy. Fig. 2 represents a detail modification that may be made of the device. The drawing (Fig. 1) illustrates a watt-hour meter 10 connected to integrate the flow of electrical energy in a power line 11. It will be understood that the shaft 12 of the meter rotates in accordance with the energy measured, and that the total kilowatt hours are registered by the usual form of - register, represented at 13. My demand meter is illustrated at the upper left of the parts above mentioned, and is shown operated through the same worm gear 14 that operates the register 13. Gear 15, driven from 14, is secured to a shaft 16 together with a gear 17 and the demand meter dial 18. The dial is graduated in a suitable demand scale which reads upward in a direction opposite to the direction of rotation of the dial. These parts rotate as a unit, at a speed proportional to that of the meter 10 or in accordance with the demand to be measured. A pointer 19 for dial 18 is frictionally secured to shaft 16 or to a hub of the dial 18, and, if not prevented from doing so, rotates with the dial 18. A sleeve 20 free to rotate on shaft 16 carries a dog 21, a ratchet wheel 22, and a gear wheel 23. Gear 23 meshes with a gear 24, which is loose on a shaft 25, driven from shaft 16 through gears 17 and 26. Gear 24 is connected to shaft 25 through a spiral spring 27. It will be seen that spring 27 is therefore wound up by energy received from the watthour meter conveyed through gears 17 and 26. This spring tends to turn gears 27 and 23 and move dog 21 in the same direction of rotation as that of dial 18. However, the dog 21 is restrained from rotation and held stationary over each demand interval by the spring pressed pawl 28 which engages with a tooth in ratchet wheel 22. The pawl 28 is withdrawn from its holding position at the end of each demand interval by any suitable form of timing device. As here represented, pawl 28 is withdrawn from its holding position by a relay 29 energized at the end of each demand interval from a source 30 through contacts 31 operated by a clock or other timing device 32.

The operation of the demand meter may be explained as follows: Initially, dog 21 is released and rotates in a counter-clockwise direction until it comes against a stop 33 in dial 18, adjacent the zero indication thereof, and friction pointer 19 is set opposite this zero indication with the dog 21 just touching it on the side to hold the friction pointer from rotation with the dial. Now, as the dial 18 rotates with meter 10 in the direction indicated by the arrow adjacent thereto, dog 21 is held stationary by pawl 28, and pointer 19 is consequently held from rotating with dial 18. Pointer 19 is thus moved up scale with respect to the dial, although the dial moves instead of the pointer, and at the same time energy is gradually stored in spring 27. At the end of the demand interval the timing device operates to close contacts 31, energizing relay 29, which momentarily withdraws pawl 28 from holding position. Dog 21 is quickly rotated by spring 27, through the connection previously described, against stop 33. The pawl 28 almost immediately moves to its holding position again and dog 21 is again held against rotation over the next demand interval. Friction pointer 19 is now free to rotate with dial 18, and indicates on the scale thereof the demand over the described timing interval. If in the next or some subsequent timing interval the demand exceeds that indicated on dial 18, the friction pointer will again be stopped by the stationary dog while the dial continues to rotate and a greater indication will result. Thus, pointer 19 indicates the maximum distances traveled by the dial during any demand period, or indicates the maximum demand during any demand period that has occurred since the friction pointer was set back to zero. The stop 33 may be in any rotative position of dial 18 at the end of a demand interval, so that the various stationary positions of dog 21 vary and the demand indication is given on a dial which rotates continuously. However, this is a slowly rotating dial. Thus, if the demand interval is fifteen minutes the maximum speed of rotation of dial 18 should not exceed one revolution in that period. Consequently, there is no difficulty in reading accurately the maximum demand indication on this dial.

The device may be further simplified by employing a spring for advancing the dog 21 which is coaxial with shaft 16 as represented in Fig. 2. The arrangement of Fig. 1 may be preferable, because it permits the use of a spring with a reduced angular motion. In either case the mechanism is somewhat more simple than that heretofore employed in demand meters. There is no setting back operation, and the energy required from the watthour meter is not sufficient to interfere with its accuracy. The arrangement, moreover, permits substantially a 360 degree demand meter scale.

It will be understood that the parts have been illustrated more or less diagrammatically, and that in the commercial meter the parts will be more compactly assembled. Such a demand meter may be built as an integral unit for assembly with the other parts of the integrating meter, or it may be a separate meter actuated through electric relays, as is common in demand meter practice. The timing device may be mechanically associated with the demand meter, instead of electrically as represented. These and such other changes in details of construction and assembly as do not depart from the true spirit and scope of the invention are intended to be included within the scope of the appended claims.

What I claim as new and desire to secure by Letters Patent of the United States, is:—

1. A demand meter comprising a graduated dial rotated in response to the demand to be measured, a pointer cooperating with the graduations on said dial, said pointer having a frictional driving connection with the dial so as to normally rotate therewith, normally stationary means extending into the path of rotation of said pointer, and time controlled means for periodically positioning said normally stationary means adjacent to a particular graduation mark on said dial.

2. A demand meter comprising a graduated dial rotated in response to the demand to be measured, a pointer pivoted on the axis of rotation of said dial and cooperating with the graduations thereon, and having a frictional driving connection with said dial so as to normally rotate therewith, a dog pivoted on the axis of rotation of said dial and extending into the path of rotation of said pointer, a resilient driving connection between said dog and dial whereby the dog tends to rotate in the same direction as said dial, means for holding said dog against rotation, time controlled means for periodically and momentarily releasing said dog and allowing it to rotate, and means for stopping the rotation of said dog when adjacent a particular graduation on said dial.

3. A demand meter comprising a shaft rotated in response to the demand to be measured, a graduated dial on said shaft and rotated therewith, a pointer pivoted on the axis of rotation of said shaft and cooperating with the graduations on said dial, a frictional driving connection between said pointer and dial whereby the pointer is normally driven with the dial, a dog pivoted on the axis of rotation of said shaft and extending into the path of movement of said pointer, a spring wound by the rotary movement of said shaft for urging said dog to rotate in the direction of rotation of the dial, means for holding said dog against rotation, time controlled means for momentarily releasing said dog at predetermined intervals of time, and a stop for said dog on said dial adjacent a particular graduation thereon.

4. A demand meter comprising a dial rotated in accordance with the demand to be measured, said dial having a graduated scale about its periphery reading upward in a direction opposite to that of the direction of rotation of said dial, a dial indicator in frictional engagement with said dial so as to normally rotate therewith, said indicator being initially positioned opposite the low end of the scale, a timing device for establishing demand measurement intervals, and means controlled by said timing device for stopping the rotation of said indicator to the extend necessary for it to indicate on the dial the maximum demand which has occurred over any demand interval.

5. A demand meter comprising a dial continuously rotated in accordance with the demand to be measured, said dial being graduated with a demand scale about its periphery, a timing device for establishing demand measurement intervals, and indicating means controlled by said timing device for indicating on said scale in terms of maximum demand the maximum amount of rotation of said dial in any demand period.

6. A demand meter comprising a dial having a demand scale about its periphery, means for continuously rotating said dial in a direction opposite to that in which its scale reads upwardly, and at a rate proportional to the demand to be measured, normally stationary means adjacent said dial, time controlled means for establishing demand measurement periods and positioning said normally stationary means adjacent the low end of the dial scale at the beginning of each demand period, and indicating means on said dial controlled by the movement of said dial relative to said normally stationary means for indicating on said scale in terms of maximum demand the maximum extent of rotation of said dial in any demand period.

WILLIAM H. PRATT.